United States Patent [19]

Botros

[11] 4,083,683
[45] Apr. 11, 1978

[54] METAL-CONTAINING POLYPROPYLENE DYED WITH 1,4-BIS-(2'-METHYL-6'-ETHYLANILINO)ANTHRAQUINONE

[75] Inventor: Raouf Botros, Beech Creek, Pa.

[73] Assignee: American Color & Chemical Corporation, Charlotte, N.C.

[21] Appl. No.: 776,895

[22] Filed: Mar. 11, 1977

[51] Int. Cl.² .................. C09B 1/00; C07C 97/12
[52] U.S. Cl. .................. 8/39 D; 8/1 XB;
8/31; 8/39 R; 8/42 D; 8/180; 260/378
[58] Field of Search ............. 8/39 D, 42 D, 180, 31; 260/378

[56] References Cited

U.S. PATENT DOCUMENTS

| | | | |
|---|---|---|---|
| 3,188,163 | 6/1965 | Dehn et al. | 8/39 D |
| 3,235,322 | 2/1966 | Tanaka et al. | 8/39 D |
| 3,240,552 | 3/1966 | Joyner et al. | 8/42 D |
| 3,409,385 | 11/1968 | Dehn et al. | 8/39 D |

OTHER PUBLICATIONS

Moncrieff, R. W., "Man-Made Fibres" (Wiley, New York), 1975, pp. 615-619.

*Primary Examiner*—A. Lionel Clingman
*Attorney, Agent, or Firm*—Armstrong, Nikaido, Marmelstein & Kubovcik

[57] ABSTRACT

Metal-containing polypropylene fibers dyed with a blue dye of the formula:

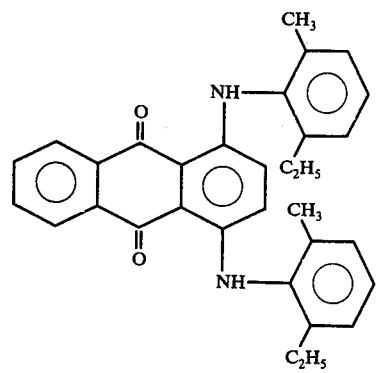

are provided. The dyed polypropylene exhibits outstanding fastness to light and dry-cleaning solvents.

2 Claims, No Drawings

METAL-CONTAINING POLYPROPYLENE DYED WITH 1,4-BIS-(2'-METHYL-6'-ETHYLANILINO)ANTHRAQUINONE

BACKGROUND OF THE INVENTION

1. Field of the Invention

The present invention relates to dyed nickel-containing polypropylene fibers. More particularly, the invention relates to nickel-containing polypropylene fibers dyed with 1,4-bis-(2'-methyl-6'-ethylanilino) anthraquinone in bright blue shades of outstanding fastness to light and dry-cleaning solvents. The invention has outstanding utility in the production of polypropylene carpets.

2. Description of the Prior Art

Polypropylene, because of its excellent mechanical strength, high elasticity and resistance to solvents, has found increased utility in recent years as filaments, yarns, fabrics, ropes and the like. Commercially available polypropylene materials generally contain metals or metal salts or chelates to provide stability against degradation due to light. These metals or metal salts or chelates also serve to provide reactive sites for dyes.

Dyes (typically chelatable dyes) having specific utility in the dyeing of such metal-containing, or metal-modified, polypropylene are reported extensively in the literature. Notwithstanding such disclosure, however, there is a continuing need, particularly in the carpet industry, for dyes which will dye metal-containing polypropylene fibers in bright aesthetic shades of outstanding fastness characteristics.

Dehn et al, U.S. Pat. No. 3,188,163, discloses blue dyed polypropylene fibers where the dye is 1,4-bis-(2', 4', 6'-triethylanilino)anthraquinone. The blue textiles are alleged to have superior washfastness and lightfastness. The polypropylene fibers of the patent, however, are not disclosed as being metal-modified.

SUMMARY OF THE INVENTION

According to the present invention, metal-containing; particularly, nickel-containing, polypropylene textile fibers are dyed in bright blue shades with the dye:

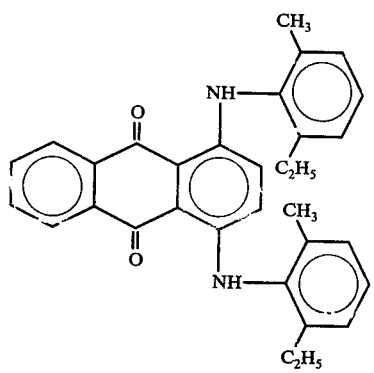

The dyed nickel-containing polypropylene fibers possess unexpectedly superior fastness to light and dry-cleaning solvents as compared to nickel-containing polypropylene fibers dyed according to Dehn et al using the structurally analogous dye, 1,4-bis-(2',4',6'-triethylanilino)antrhaquinone.

DESCRIPTION OF PREFERRED EMBODIMENTS

Nickel-containing polypropylene fiber materials are typically employed as the metal-containing polypropylene fibers according to the present invention. It is believed, however, that any of the conventionally produced polypropylene materials generally designated in the textile art as "polypropylene fibers", which contain Werner Complex forming metal such as aluminum, nickel, zinc and the like either as such or in the form of its salts or chelates dyed with the particular anthraquinone dye according to the present invention will possess the outstanding fastness properties. The exact metal content of the metal-containing polypropylene fibers is not generally specified by the manufacturer, but is believed to vary within the range of about 0.1 to about 2.0 weight percent. The metal improves the dyeing properties of the fiber materials and also serves to stabilize the materials against degradation due to light and heat. Nickel-containing polypropylene materials are available commercially, for example, under the trademark HERCULON.

The 1,4-bis-(2'-methyl-4'-ethylanilino)anthraquinone employed in the present invention is prepared according to conventional methods by condensing leucoquinizarin with 2-methyl-6-ethylaniline, followed by an oxidation step.

To prepare the dye for application to the metal-modified fiber substrates, it must be suitably dispersed. This may be done by any of several well-known methods, e.g., milling as in a ball-mill with dispersing agents such as lignin sulfonic acid materials. The resultant aqueous dispersion can be dried, as in a spray-dryer, or preserved and used as a paste. Standardization to any desired lower strength can be done with inert colorless diluents such as water soluble inorganic salts, soluble organic materials or additional dispersant for powders, or water for pastes. Other materials such as preservatives, foam-control agents, and wetting agents (for powders) may be added as desired.

Dispersed pastes are made by wet milling the dye in conventional equipment in the presence of a dispersing agent, preferably sodium lignin sulfonate or sodium alkylnaphthalene sulfonate. Various other commercially available dispersing agents, such as sodium salts of carboxylated polyelectrolytes and the naphthalene sulfonates, e.g., the condensation products of sulfonated naphthalene and formaldehyde, such as sodium dinaphthylmethane disulfonate, are conveniently used. The disperse paste may be cut or standardized to a standard strength with water. The final color content of the finished paste is usually from 5– 40 percent by weight (pure color) active dye base.

Disperse powders are prepared by wet milling color in the presence of a dispersant, such as those mentioned hereabove, in equipment such as a ball-mill, Werner-Pfleiderer mill or attritor. The dispersed material is oven or spray dried and micropulverized if necessary to provide the dispersed powder. The color is cut or standardized to a standard strength in a blender with a diluent, such as the same or another dispersant or dextrin. A wetting agent, such as sodium cetyl sulfate or an alkylaryl polyether alcohol may be added to aid in wetting out the product whhen it is placed in the dye bath. Disperse powders are usually cut or standardized to 10 – 50 percent by weight color content (pure color).

The disperse dyes may be applied to the metal-containing polypropylene fibers in a manner conventional in the dyeing of disperse dyestuffs and may be applied, for example, as neutral, acidic, or alkaline aqueous suspensions, with the use of dispersing agents, from a dyebath, preferably at temperatures of from 50° C to 105° C. When temperatures of less than about 100° C are employed it is sometimes advantageous to add a customary carrier substance. These dyes can also be applied to the metal-containing polypropylene fabrics by a printing process. The printing paste can be thickened with customary thickening agents and may also contain other additives conventionally used with printing pastes. The printing paste is expediently applied to the fabric by a printing block or a roller, after which the printed fabric is dried and steamed at a temperature between 105° C and 110° C. After the dyeing or printing of the polypropylene material, it is treated with a hot aqueous soap solution, rinsed and dried. As suitable dyeing and printing techniques there may be mentioned those described in U.S. Pat. Nos. 3,399,027; 3,399,952; 3,492,078; 3,556,709; and 3,360,656.

Nickel-containing carpet printed with the 1,4-bis-(2'-methyl-6'-ethylanilino)anthraquinone shows excellent fastness properties. The fabric is colored with strong, bright blue hues which are exceptionally fast to light, dry-cleaning, crocking, gas and heat.

The invention may be better understood by referring to the examples set forth below. In the examples, the properties of dyed or printed polypropylene were evaluated according to the following tests:

Test No. 1: (Crocking) A crock test on an air dried sample, i.e., a portion of printed or dyed fiber, fabric or carpet construction, is conducted in accordance with AATCC Test Method 8-1972, page 112 of the 1974 Technical Manual of AATCC.

Test No. 2: (heat Stability) A heat stability test determined by subjecting an air dried sample to a heat treatment of 250° F for 20 minutes. The heat treated sample is compared to an air dried sample with respect to shade change.

Test No. 3: (Crocking) The sample from Test No. 2 is tested for crocking according to the procedure of Test No. 1. There should be no change in crocking.

Test No. 4: (Light fastness) A practical strength of a dyed or printed air dried sample is exposed to a Xenon arc lamp (AATCC Test Method 16E-1974, page 133 of the 1974 Technical Manual of the AATCC). A range of 3L4 to 4L4 exposures are the lower limit of desirability in the carpet trade.

Test No. 5: (Dry-cleaning) An air dried sample is tested for color fastness to dry-cleaning in accordance with AATCC Test Method No. 132-1973, page 117 of the 1974 Technical Manual of the AATCC.

EXAMPLE I

A. Preparation of the Dye:

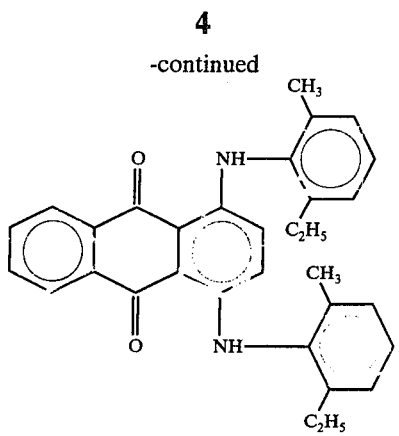

(M.W. 474)

A mixture of 250 g 2-methyl-6-ethylaniline, 20 g boric acid, 37 g leucoquinizaric and 11 g glacial acetic acid was heated at 120° C to 140° C until 10 g aqueous distillate was colleted. The temperature was then raised to 160° C and was held there for 4 hours. The reaction mass was cooled to 100° C and was drowned into a mixture of 1000 ml cold water and 100 g 32% hydrochloric acid. After stirring for 4 hours, the reaction mass was heated to 75° C and filtered at this temperature. The cake was washed neutral with water and dried at 80° C. The dried leuco product was mixed with 220 g methyl cellosolve and the mixture was oxidized with air at 100°–110° C for 4 hours. The reaction mass was then cooled to 20° C and filtered. The cake was washed first with 35 g denatured alcohol, then with water and dried in an oven.

Yield: 95 g    Theory: 129.4 g 30 g of the above product was charged to a sandmill with 30 g of Lignosel FTA (a commercially available ligninsulfonic acid dispersant sold by Lignosol Chemical, Quebec, Canada) and 140 ml water. The mixture was sandmilled until dispersion test was satisfactory.

Yield: 200 g of 15% Color Content Paste

B. Preparation of the Dye (for comparison):

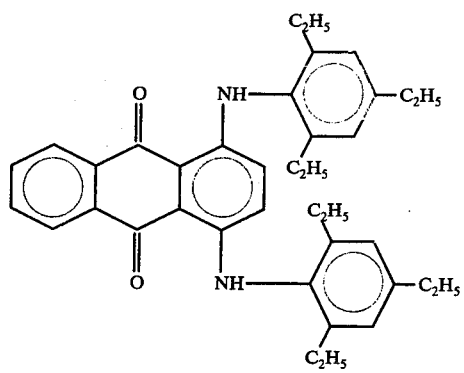

(M.W. 558)

A mixture of 26.8 g leuco 1,4-diaminoanthraquinone, 60.3 g bromotriethylbenzene, 50 g nitrobenzene, 12.7 g soda ash and 0.3 g cuprous iodide was heated at 185°-190° C for 10 hours until the starting material or the monosubstituted product is no longer present by TLC. The reaction mass was then cooled to 70° C, and there was added at 70° to 175° C 300 ml denatured alcohol. The mixture was stirred at reflux for 6 hours, then stirred to room temperature. The mass was filtered and the cake was washed first with alcohol, then with hot water. The product was dried in an oven.

Yield: 55.4 g Theory: 55.8 g 30 g of the above product was charged to a sandmill with 30 g Lignosol FTA and 140 ml water. The mixture was sandmilled until dispersion test was satisfactory.

Yield: 200 g of 15% Color Content Paste

EXAMPLE II

The dyes of Example I are evaluated by a pad-steam method. According to this method a stock paste is first prepared. The stock paaste is an aqueous mixture containing 3.2% Indalca CB-30 (a modified locust bean gum sold by Hercules); 0.25% of Sequesterene ST (an EDTA sequestering agent sold by Ciga-Geigy); 0.25% of an antifoam agent; and 0.20% citric acid. A print paste is prepared by mixing 60% of the stock paste; 1.25% Progalan X-13; 0.5% antifoam and X% dye; the remainder being water.

Dyebaths of the printing paste are prepared containing 2.0%, 1.0% and 0.1% of each of the dyes of Example I. Pieces of a nickel-containing polypropylene carpet (HERCULON IV, a trademark of Hercules, Inc.), 6 inch × 10 inch and without the foam backing are dipped into the respective dyebaths until saturated (generally a matter of minutes). These pieces are run through a pad to approximately 170% wet pick up and are then steamed for 10 minutes at approximately 212°-215° F under atmospheric conditions and air dried.

Evaluating the dyed samples according to the procedures outlined above, the dyed nickel-contaning polypropylene according to the present invention (using the dye of Example I(A)) was found to have good shade build and to be satisfactory in the dry-cleaning test. Xenon light fastness was at least 4L4 exposures for the medium and heavy shades. The dyed nickel-containing polypropylene carpet corresponding to Dehn et al (using the dye of Example I(B)), on the other hand, showed poor shade build and only 2L4 exposures under xenon. The dyed polypropylene according to the present invention and according to Dehn et al showed good crocking.

The superior results shown for the dyed nickel-containing polypropylene carpet according to the present invention are surprising in view of the structural similarities of the respective dyes.

What is claimed is:

1. Dyed metal-containing polypropylene fibers, the dye being:

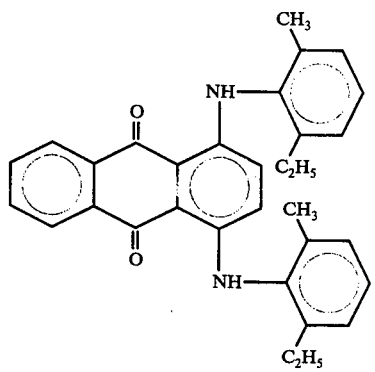

the metal of said metal-containing polypropylene fibers being selected from the group consisting of aluminum, nickel and zinc.

2. The dyed metal-containing polypropylene fibers of claim 1, wherein the metal-containing polypropylene fibers are nickel-containing polypropylene fibers.